(12) United States Patent
Pattison et al.

(10) Patent No.: US 10,070,639 B2
(45) Date of Patent: Sep. 11, 2018

(54) HEAT SYSTEM FOR KILLING PESTS

(71) Applicant: Ecolab USA Inc., St. Paul, MN (US)

(72) Inventors: William J. Pattison, Greensboro, NC (US); S. John Barcay, Burnsville, MN (US); Jason G. Lang, Bloomington, MN (US); Christopher C. Wagner, St. Paul, MN (US); Christopher D. Diller, Bloomington, MN (US); Joelle F. Olson, Shoreview, MN (US)

(73) Assignee: Ecolab USA Inc., St. Paul, MN (US)

( * ) Notice: Subject to any disclaimer, the term of this patent is extended or adjusted under 35 U.S.C. 154(b) by 348 days.

(21) Appl. No.: 14/954,352

(22) Filed: Nov. 30, 2015

(65) Prior Publication Data
US 2016/0073623 A1    Mar. 17, 2016

Related U.S. Application Data

(62) Division of application No. 13/421,409, filed on Mar. 15, 2012, now Pat. No. 9,226,489.

(60) Provisional application No. 61/454,255, filed on Mar. 18, 2011.

(51) Int. Cl.
*A01M 1/20*    (2006.01)

(52) U.S. Cl.
CPC ................. *A01M 1/2094* (2013.01)

(58) Field of Classification Search
CPC .................................................. A01M 1/2094
See application file for complete search history.

(56) References Cited

U.S. PATENT DOCUMENTS

| 3,056,415 | A | | 7/1962 | Nimmo |
| 3,327,441 | A | | 6/1967 | Kelly |
| 4,033,367 | A | | 7/1977 | Johnston |
| 4,817,329 | A | | 4/1989 | Forbes |
| 4,941,499 | A | | 7/1990 | Pelsue et al. |
| 4,953,320 | A | | 9/1990 | Nelson |
| 4,958,456 | A | | 9/1990 | Chaudoin |
| 4,961,283 | A | * | 10/1990 | Forbes ............... A01M 1/2094 43/124 |
| 5,244,001 | A | | 9/1993 | Lynch |
| 5,282,334 | A | | 2/1994 | Kimura |
| 5,349,778 | A | | 9/1994 | Chu |
| 5,471,782 | A | | 12/1995 | Brittell |
| 5,569,401 | A | | 10/1996 | Gilliland et al. |
| 5,575,106 | A | | 11/1996 | Martin et al. |
| 5,638,848 | A | | 6/1997 | November |

(Continued)

FOREIGN PATENT DOCUMENTS

| CA | 2387235 | 11/2002 |
| DE | 43 40 798 A1 | 6/1995 |

(Continued)

OTHER PUBLICATIONS

Fantech, "Installation and Maintenance Instructions for Model FG," Jul. 18, 2007 and Apr. 7, 2010, 10 pages.

(Continued)

*Primary Examiner* — Christopher P Ellis
(74) *Attorney, Agent, or Firm* — Merchant & Gould P.C.

(57) ABSTRACT

The present disclosure generally relates to the field of pest elimination including all life stages of bed bugs. The present disclosure includes articles, systems, and methods of heat treatment to target and kill pests.

19 Claims, 10 Drawing Sheets

(56) References Cited

U.S. PATENT DOCUMENTS

| | | |
|---|---|---|
| 5,641,463 A | 6/1997 | Langhart |
| 5,658,130 A | 8/1997 | Goldstein |
| 5,768,907 A | 6/1998 | Lee |
| 5,792,419 A | 8/1998 | Williamson et al. |
| 6,141,901 A | 11/2000 | Johnson |
| 6,192,598 B1 | 2/2001 | Halverson et al. |
| 6,279,261 B1 | 8/2001 | Binker et al. |
| 6,302,094 B1 | 10/2001 | Wehrly |
| 6,327,812 B1* | 12/2001 | Hedman .............. A01M 1/2094 43/124 |
| 6,337,080 B1 | 1/2002 | Fryan et al. |
| 6,588,140 B1 | 7/2003 | Johnson |
| 6,612,067 B2 | 9/2003 | Topp |
| 6,647,661 B2 | 11/2003 | Grigorov |
| 6,678,994 B2 | 1/2004 | Topp |
| 6,772,829 B2 | 8/2004 | Lebrun |
| 7,134,239 B2 | 11/2006 | Barra |
| 7,168,630 B1 | 1/2007 | Ketcha |
| 7,195,025 B2 | 3/2007 | Choi et al. |
| 7,481,234 B1 | 1/2009 | Gustafson |
| 7,591,099 B2 | 9/2009 | Lang |
| 7,676,985 B1 | 3/2010 | Perkins |
| 7,690,148 B2 | 4/2010 | Hedman |
| 7,719,429 B2 | 5/2010 | Barber |
| 7,743,552 B2 | 6/2010 | Borth |
| 7,926,222 B2 | 4/2011 | Molnar |
| 9,101,125 B2 | 8/2015 | Knote |
| 9,609,857 B2* | 4/2017 | Nugent .............. A01M 1/2094 |
| 2001/0004813 A1 | 6/2001 | Hedman |
| 2002/0062852 A1 | 5/2002 | Jopp et al. |
| 2003/0029605 A1* | 2/2003 | Lebrun .............. F28D 1/024 165/121 |
| 2005/0220662 A1* | 10/2005 | Hedman .............. A01M 1/2094 422/1 |
| 2005/0224492 A1* | 10/2005 | Roy .............. G01R 31/2862 219/494 |
| 2005/0246942 A1* | 11/2005 | Mueller .............. A01M 1/2094 43/124 |
| 2005/0268543 A1 | 12/2005 | Hicks et al. |
| 2006/0213546 A1* | 9/2006 | Mitsui .............. E04H 15/42 135/121 |
| 2007/0016271 A1 | 1/2007 | Hammond |
| 2007/0050903 A1 | 8/2007 | Sappenfield |
| 2007/0283986 A1 | 12/2007 | Baum |
| 2008/0014111 A1 | 1/2008 | Hedman |
| 2008/0222808 A1* | 9/2008 | Bell .............. A47C 31/007 5/500 |
| 2008/0264925 A1 | 10/2008 | Lockhart |
| 2009/0049764 A1 | 2/2009 | McCulloch et al. |
| 2009/0211148 A1 | 8/2009 | McCarty |
| 2009/0260276 A1* | 10/2009 | Kirsch .............. A01M 1/023 43/114 |
| 2010/0065094 A1 | 3/2010 | Ways |
| 2010/0071258 A1 | 3/2010 | Molnar |
| 2010/0186792 A1 | 7/2010 | Imhof |
| 2010/0329649 A1 | 12/2010 | Potter |
| 2011/0289825 A1* | 12/2011 | James .............. A01M 1/2094 43/132.1 |
| 2011/0308139 A1* | 12/2011 | James .............. A01M 1/2094 43/132.1 |
| 2012/0060407 A1 | 3/2012 | Lindsey |
| 2012/0096761 A1 | 4/2012 | Smith |
| 2012/0180381 A1* | 7/2012 | DeMonte .............. A01M 1/2094 43/144 |
| 2012/0186138 A1* | 7/2012 | Bell .............. A01M 13/003 43/125 |
| 2012/0192479 A1* | 8/2012 | Schmitz .............. A01M 1/2094 43/132.1 |
| 2012/0216444 A1* | 8/2012 | Raud .............. A01M 1/2094 43/132.1 |
| 2012/0233907 A1 | 9/2012 | Pattison |
| 2013/0263496 A1* | 10/2013 | Maloney .............. A01M 1/2094 43/114 |
| 2013/0269239 A1* | 10/2013 | Whitley .............. A01M 1/2094 43/132.1 |
| 2013/0276357 A1 | 10/2013 | Knote |
| 2013/0276358 A1* | 10/2013 | Knote .............. A01M 1/2094 43/132.1 |
| 2014/0013653 A1* | 1/2014 | Lander .............. A01M 1/2088 43/132.1 |

FOREIGN PATENT DOCUMENTS

| | | |
|---|---|---|
| DE | 692 30 043 T2 | 1/2000 |
| DE | 202004003142 U1 | 6/2004 |
| DE | 698 36 759 T2 | 10/2007 |
| DE | 603 16 443 T2 | 5/2008 |
| EP | 0 298 599 B1 | 1/1989 |
| EP | 0 575 952 A1 | 12/1993 |
| EP | 0 673 387 B1 | 9/1999 |
| EP | 0 963 694 A1 | 12/1999 |
| EP | 0 963 694 B1 | 12/2002 |
| EP | 1 220 604 B1 | 11/2004 |
| EP | 1 029 044 B1 | 12/2006 |
| EP | 1 034 273 B1 | 12/2006 |
| EP | 1 356 730 B1 | 6/2007 |
| EP | 1356730 B1 | 6/2007 |
| EP | 1 811 224 A2 | 7/2007 |
| EP | 1 521 524 B1 | 9/2007 |
| EP | 1 942 300 A1 | 7/2008 |
| EP | 1 969 971 A1 | 9/2008 |
| EP | 1 706 033 B1 | 7/2010 |
| EP | 1 443 958 B1 | 12/2010 |
| EP | 1 283 716 B1 | 3/2012 |
| EP | 1 571 911 B1 | 6/2012 |
| EP | 0963694 B1 | 12/2012 |
| GB | 359938 | 10/1931 |
| GB | 1089853 | 11/1967 |
| GB | 1092421 | 11/1967 |
| GB | 1 244 414 | 9/1971 |
| GB | 2 096 569 A | 10/1982 |
| GB | 2 195 078 A | 3/1988 |
| GB | 2 195 875 | 4/1988 |
| GB | 2 206 790 A | 1/1989 |
| GB | 2430158 | 3/2007 |
| JP | 57-75654 | 5/1982 |
| JP | 58-72504 | 4/1983 |
| JP | 59-196439 | 11/1984 |
| JP | 59-196440 | 11/1984 |
| JP | 60-61509 | 4/1985 |
| JP | 60-199804 | 10/1985 |
| JP | 64-37958 | 2/1989 |
| JP | 64-38004 | 2/1989 |
| JP | 1-93505 | 4/1989 |
| JP | 1-156901 | 6/1989 |
| JP | 1-170468 | 7/1989 |
| JP | 1-212560 | 8/1989 |
| JP | 1-282619 | 11/1989 |
| JP | 2-40306 | 2/1990 |
| JP | 2-65868 | 3/1990 |
| JP | 2-282308 | 11/1990 |
| JP | 3-44305 | 2/1991 |
| JP | 3-133906 | 6/1991 |
| JP | 3-151308 | 6/1991 |
| JP | 4-185766 | 7/1992 |
| JP | 4-185767 | 7/1992 |
| JP | 4-217606 | 8/1992 |
| JP | 4-235141 | 8/1992 |
| JP | 4-343853 | 11/1992 |
| JP | 5-17310 | 1/1993 |
| JP | 1096215 | 1/1993 |
| JP | 5-178706 | 7/1993 |
| JP | 5-255026 | 10/1993 |
| JP | 5-294895 | 11/1993 |
| JP | 6-16503 | 1/1994 |
| JP | 6-311980 | 11/1994 |
| JP | 6-346373 | 12/1994 |
| JP | 7-173005 | 7/1995 |
| JP | 7-279049 | 10/1995 |
| JP | 7-279050 | 10/1995 |
| JP | 7-287013 | 10/1995 |
| JP | 7-316003 | 12/1995 |

(56) References Cited

FOREIGN PATENT DOCUMENTS

| | | |
|---|---|---|
| JP | 8-56543 | 3/1996 |
| JP | 8-188510 | 7/1996 |
| JP | 8-188966 | 7/1996 |
| JP | 9-67396 | 3/1997 |
| JP | 9-108337 | 4/1997 |
| JP | 9-159584 | 6/1997 |
| JP | 9-227305 | 9/1997 |
| JP | 10-36201 | 2/1998 |
| JP | 10-150902 | 6/1998 |
| JP | 10-203907 | 8/1998 |
| JP | 11-19088 | 1/1999 |
| JP | 11-240802 | 9/1999 |
| JP | 2001120145 A | 5/2001 |
| JP | 2001157538 A | 6/2001 |
| JP | 2001316212 A | 11/2001 |
| JP | 2003-95827 | 4/2003 |
| JP | 2004-65140 | 3/2004 |
| JP | 2005-255209 | 9/2005 |
| JP | 2005255209 A | 9/2005 |
| WO | WO 94/13698 | 6/1994 |
| WO | WO 97/15600 | 5/1997 |
| WO | WO 98/16107 | 4/1998 |
| WO | WO 99/24567 | 5/1999 |
| WO | WO 99/27104 | 6/1999 |
| WO | WO 01/80881 A1 | 11/2001 |
| WO | WO 01/089295 A3 | 11/2001 |
| WO | WO2001089295 A2 | 11/2001 |
| WO | WO 02/05644 A1 | 1/2002 |
| WO | WO 03/030931 A2 | 4/2003 |
| WO | WO 03/103395 A1 | 12/2003 |
| WO | WO 2004/014134 | 2/2004 |
| WO | WO 2004/045291 A1 | 6/2004 |
| WO | WO 2004/082376 A1 | 9/2004 |
| WO | WO 2005/067798 A1 | 7/2005 |
| WO | 2006-188503 | 7/2006 |
| WO | WO 2007/027601 A2 | 3/2007 |
| WO | WO 2008/051501 A2 | 5/2008 |
| WO | WO 2010/036331 A1 | 4/2010 |
| WO | WO 2010/096184 | 8/2010 |

OTHER PUBLICATIONS

Leventhal, Stephanie, "UF creates cheap way to battle bed bugs," article from the Independent Florida Alligator, Jul. 14, 2009, 3 pages.
Lupo, Lisa, "Treating with Heat, a Simple Principle—A Complex Application," QA Magazine, Mar./Apr. 2008, 4 pages.
"NorpacR2 Arctic Outdoor Shelter Fabric" press release, dated prior to Aug. 2007 ice fishing season, 2 pages.
Pereira et al., "Lethal Effects of Heat and Use of Localized Heat Treatment for Control of Bed Bug Infestations," Journal of Economic Entomology, vol. 102, No. 3, Entomological Society of America, Jun. 2009, 7 pages.
Printout from http://www.bedbugchaser.com/about_BedBug_Chaser.html, dated Jun. 14, 2011, 1 page.
Printout from http://www.mypmp.net/bed-bugs/the-heat-on?print=1 printed Dec. 4, 2009 from a post dated Nov. 23, 2009, 1 page.
"Propane-fueled Thermal Remediation" technology fact sheet, Propane Education and Research Council, Mar. 2007, 2 pages.
Smith, Charles, "Turning the heat up under infested homes/popular alternative to fumigation attacks, mold and fungus," posted on SFGate.com, dated Aug. 30, 2003, accessed via http://articles.sfgate.com/2003-08-30/home-and-garden/17505027_1_heat-treatment-fumi . . . on Dec. 15, 2009, 2 pages.
Tjernlund AirShare Ventilators products brochure, Jan. 2009, 2 pages.
Tjernlund UnderAire Crawl Space Ventilators products brochure, 2006, 2 pages.
Tjernlund Ventilation Products brochure, copyright 2009, 4 pages.
International Search Report and Written Opinion dated Sep. 10, 2012.
Pereira et al., University of Florida, www.pctonline.com, pp. 34-39 (Mar. 2009).

* cited by examiner

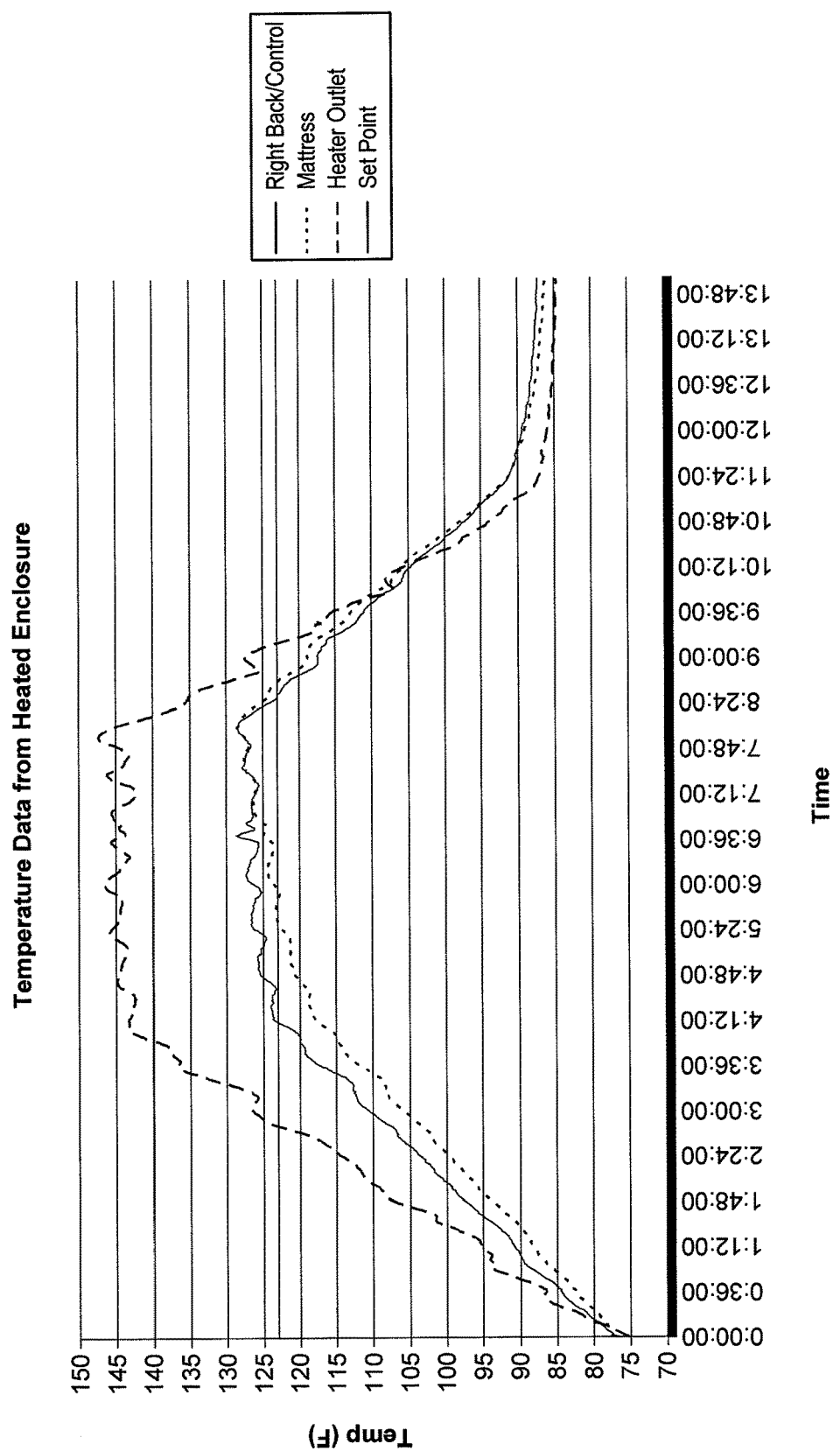

HEAT SYSTEM FOR KILLING PESTS

CROSS REFERENCE TO RELATED APPLICATIONS

This application is a divisional of U.S. application Ser. No. 13/421,409, filed Mar. 15, 2012, now U.S. Pat. No. 9,226,489, issued Jan. 5, 2016, which claims priority to Provisional Application Ser. No. 61/454,255 filed Mar. 18, 2011, which are both incorporated by reference herein in their entirety.

FIELD

The present disclosure generally relates to the field of pest elimination. The present disclosure includes articles, systems, and methods of heat treatment to target and kill pests such as arthropods, rats, and mice. The present disclosure is especially suited for killing all life stages of bed bugs.

BACKGROUND

Some methods of pest treatment require discarding suspected infested articles. These items can be expensive to replace, especially in the case of large objects like furniture, mattresses, and box springs. Some methods of pest treatment exclusively rely on pesticides, which may be restricted or prohibited on certain items, particularly items that contact people. Finally, some methods of pest treatment use heat but can damage objects, create cold spots that provide a harborage for pests, require large amounts of heat, or are energy inefficient, for example in the case of heat treatments that heat entire rooms or buildings.

It is against this background that the present disclosure is made.

SUMMARY

Surprisingly, it has been found that an infested article or suspected article can be treated by using high heat temperatures and without damaging the article itself.

In some embodiments, the disclosure relates to a method of treating an article suspected of being infested. In the method, an article is placed inside of an enclosure, the enclosure is sealed, and the temperature inside of the enclosure is ramped up at a rate of from about 10 to about 15 degrees Fahrenheit per hour, or 1 degree Fahrenheit every six minutes, until a temperature of at least 115° F. is reached. Once 115° F. is reached, the temperature is held for at least four hours. Thereafter, in some embodiments, the temperature may be slowly decreased at a rate of about 10 to about 15 degrees an hour, or one degree every six minutes, until the original starting temperature (which may be room temperature) is reached.

In some embodiments, the disclosure relates to a method of automatically adjusting the temperature inside of a sealed enclosure in order to treat an article. In this method, a flexible, inflatable enclosure and heating system are provided. The heating system has a heater. The heating system also has at least one thermocouple electrically connected to the heater and located inside of the inflated enclosure. The thermocouple measures the actual air temperature inside of the enclosure ($T_{actual}$). The heating system also includes a programmable logic controller electrically connected to the heater and the thermocouple and programmed with a predetermined temperature ramp rate controlled by a set point temperature ($T_{setpoint}$) and a target temperature ($T_{target}$). The programmable logic controller increases the temperature inside of the enclosure by increasing the $T_{setpoint}$ one degree every six minutes until $T_{target}$ is reached, comparing the $T_{actual}$ to the $T_{setpoint}$, and adjusting the heater in response to the difference between $T_{actual}$ and $T_{setpoint}$. In some embodiments, the programmable logic controller also controls the decrease in temperature.

In some embodiments, the disclosure relates to a flexible and inflatable enclosure for treating an article suspected of being infested with an arthropod or other pest. The enclosure has a floor, a ceiling, and at least one wall, where at least part of the ceiling or the wall can be partially removed to allow for the selected article to be placed inside of the enclosure.

In some embodiments, the disclosure relates to a treatment system. The system includes a flexible and inflatable enclosure having a floor, a ceiling, and at least one wall, where at least part of the ceiling or wall can be at least partially removed to allow for the selected article to be placed inside of the enclosure. The system also includes a heating system with a first heater, a thermocouple electrically connected to the heater and configured to be located inside of the inflated enclosure, and a programmable logic controller electrically connected to the first heater and the thermocouple. In some embodiments, the system can also include a fan designed to be used inside of the inflated enclosure, and an external support structure.

BRIEF DESCRIPTION OF THE FIGURES

FIG. 9 shows temperature data from a heated enclosure with a mattress in it.

Figure 1:
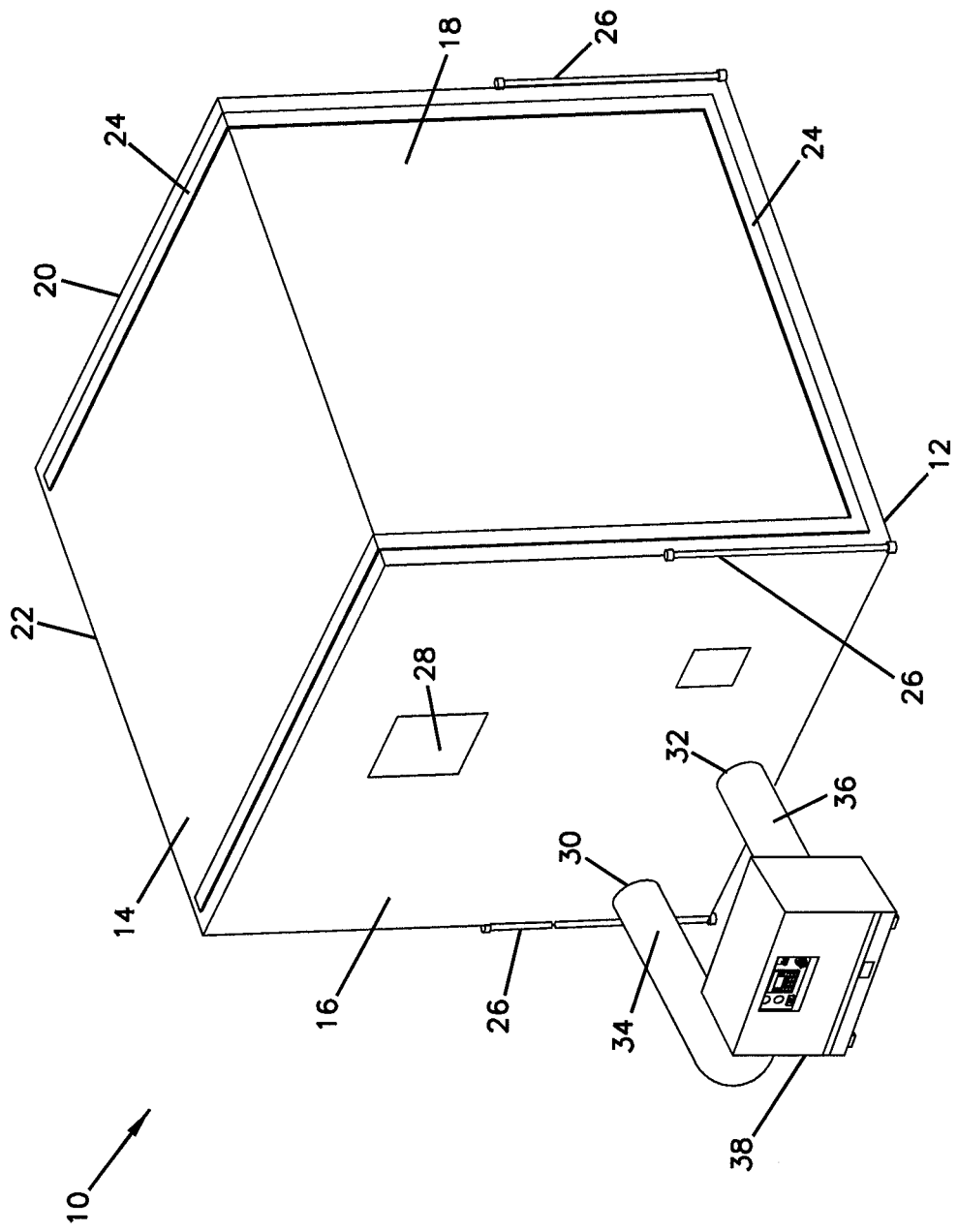
FIG. 1 shows a diagram of an exemplary enclosure and heating system.

In accordance with common practice, the various described features are not drawn to scale but are drawn to emphasize certain features relevant to the present disclosure. Reference characters denote like features throughout the Figures.

DETAILED DESCRIPTION

In some embodiments, the present disclosure relates to articles, systems, and methods of heat treatment to target and kill pests including all life stages of bed bugs. Surprisingly, it has been found that gradually increasing the temperature inside of an enclosure allows for heat treatment of articles that are believed to be infested with pests without adversely affecting the article. In the past, these articles may have been discarded instead of treated in part because their size and internal spaces did not lend them to be effectively treated with pesticides, traditional heat treatments can damage the article, and label restrictions on pesticides did not allow for treatment of items that contact humans on a regular basis.

Exemplary articles include mattresses, box springs, and furniture, although any article would benefit from the disclosed methods, articles, and systems. Articles, systems, and methods disclosed herein are effective at eliminating pests including 100% of bed bug eggs, nymphs, and adults.

The Enclosure and Treatment System

In some embodiments, the present disclosure includes a flexible and inflatable enclosure. Using a flexible and inflatable enclosure allows the enclosure to be easily set up and taken down from one treatment site to the next. The enclosure, when inflated, can take on a variety of shapes including a sphere, a cylinder, a cube, and a box. A cube and a box are preferred shapes because they are practical and easy to manufacture. A sphere with a flat bottom is also a preferred shape because it circulates air uniformly throughout the interior which minimizes cold spots. While an inflatable enclosure is disclosed, it is understood that other enclosures could be used such as a flexible enclosure with an internal or external frame to hold the enclosure up. In some embodiments, the enclosure does not need to be inflatable or flexible. In these embodiments, the enclosure may be rigid. The rigid enclosure may also be foldable or collapsible. Exemplary rigid enclosures could include pre-formed rigid panels that are assembled into the final enclosure, foldable panels that can be assembled into the final enclosure, or expandable panels that can be assembled into the final enclosure. The rigid enclosure may optionally be insulated.

Figure 2:
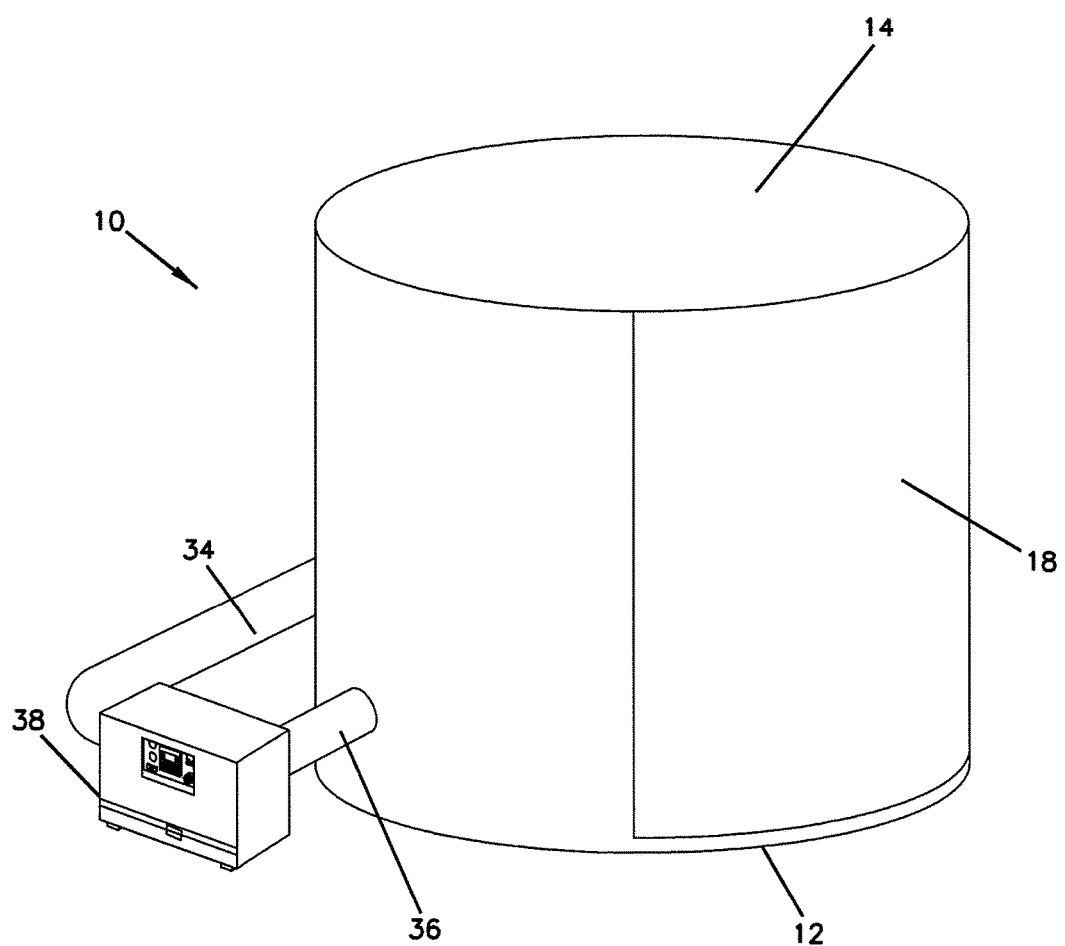
FIG. 2 shows a diagram of an exemplary enclosure and heating system.
Figure 3:
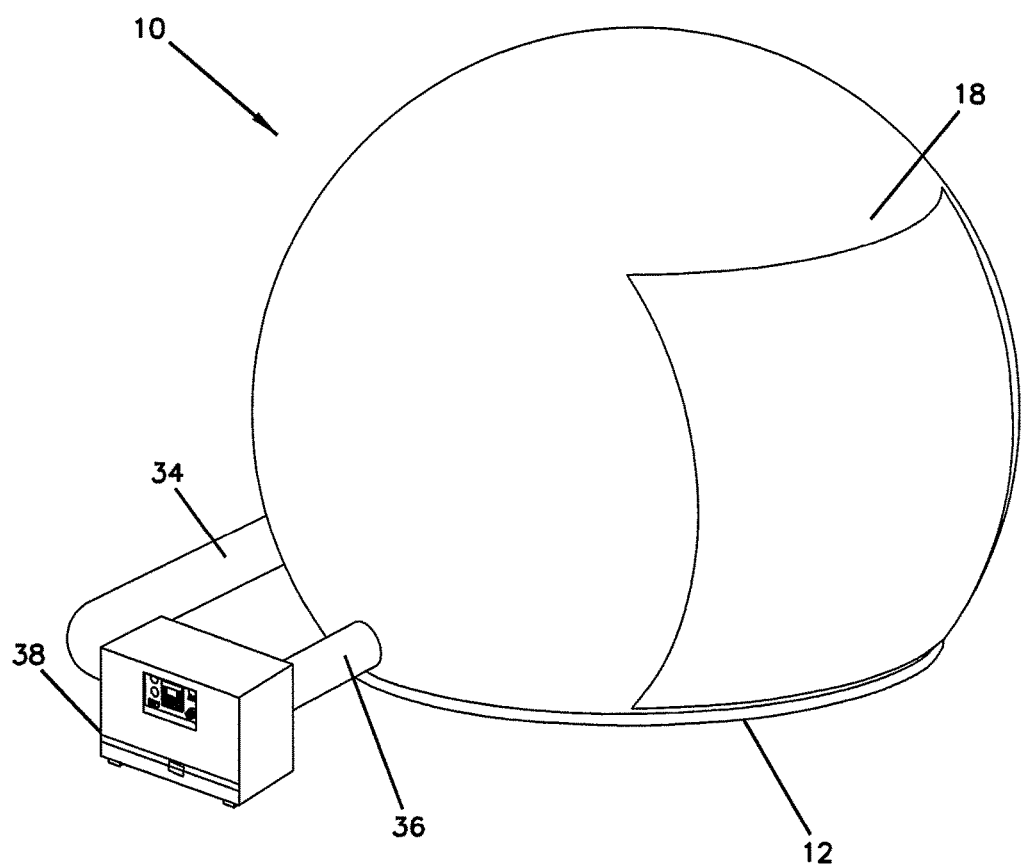
FIG. 3 shows a diagram of an exemplary enclosure and heating system.
Figure 4:
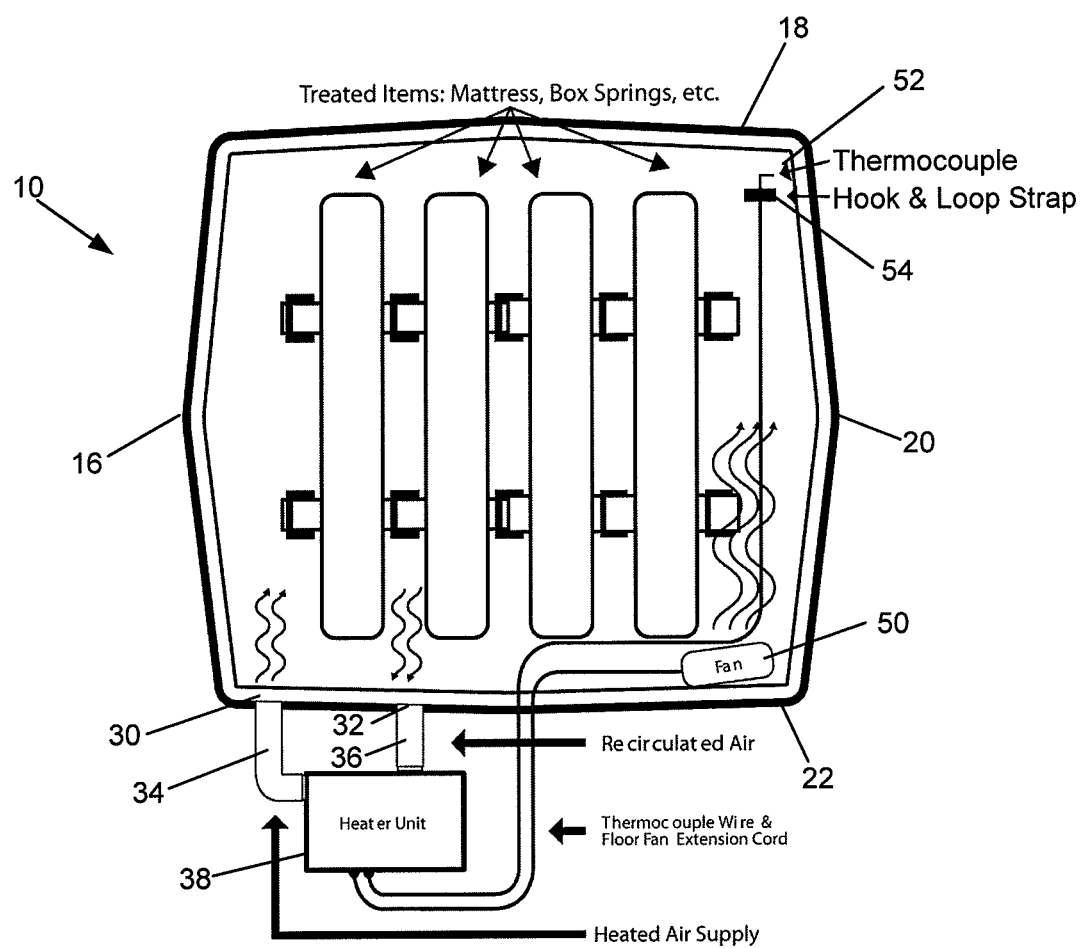
FIG. 4 shows a schematic of an exemplary enclosure and heating system.

An exemplary enclosure is shown in FIG. 1. Alternative enclosures are shown in FIGS. 2, 3, and 4. Referring now to FIG. 1, if the enclosure forms a cube or a box, then the enclosure 10 includes a floor 12, a ceiling 14, and four walls 16, 18, 20, and 22. While four walls are shown in FIG. 1, it understood that shapes with one wall, or other combination of walls, could be used (as in the case of a sphere or cylinder). Note that the wall does not need to be flat. In order to facilitate getting large objects in and out of the enclosure, one wall 18 and the ceiling 14 are preferably at least partially removable. In some embodiments, the one wall 18 and the ceiling 14 can be connected to each other, and the ceiling can be connected to the rest of the enclosure on one side (near wall 22 for example), so that the ceiling and the wall together form a large flap that comes over the top and down one side of the enclosure. This "flap" can be connected to the rest of the enclosure, for example by using a zipper 24. In other words, the enclosure can be opened by unzipping one wall and the ceiling, and peeling back the wall and ceiling to allow for an article to be placed inside of the enclosure, and then the ceiling and the wall can be placed back into position and zipped up to seal the enclosure. In some embodiments, the enclosure includes a hook and loop sealing system that goes over the zipper to further insulate the interior of the enclosure. In some embodiments, the enclosure may also include a hook and loop sealing system on the exterior of each window so as to minimize any heat loss when the window is not being used.

In some embodiments, the enclosure includes an external support structure, skeleton, or frame 26. While such a structure, skeleton, or frame may be unnecessary in order for the enclosure to be able to inflate and stand on its own, it has been found that a structure, skeleton, or frame aids in preventing the formation of cold spots on the inside of the enclosure. If part of the enclosure collapses or a corner gets pinched while the enclosure is inflated, then the hot air may not circulate to that portion of the enclosure. If the temperature of that spot does not rise to 115° F. and remain there for the designated period of time, that spot may become a harborage for pests. If pests survive inside the enclosure, then the enclosure can actually become a source of contamination when the enclosure is taken down and transported to the next location. In some embodiments, the structure is a plurality of bars located on the corners of the enclosure. In some embodiments, the structure is a scaffolding or frame that attaches to the bottom, sides, and top of the enclosure.

In some embodiments, the enclosure is made of insulated material that makes the enclosure energy efficient. An example of insulated material is the Norpac R2 and Norpac M3 Insulation, commercially available from Norpac LLC (Rogers, Minn.), which may be used together as a combination Norpac R2/M3 material from Norpac LLC and can also be used together with Thinsulate™ Insulation FR from 3M (St. Paul, Minn.). Other types of insulation that might be suitable include Thermal-Wrap® nuclear-grade blanket insulation (Transco Products), HeatShield products (Heatshield), heat blankets (Heatcon), swimming pool thermal covers, outdoor plant covers, Kevlar tarps, polystyrene, Thinsulate, insulated canvas, vinyl, space blankets, Nomex, and Thermarest materials. In some embodiments, the material selected has an R-value, which is a measure of thermal resistance, of about 0.5, about 0.8, about 1, about 1.4, about 2, about 3, about 4, at least 0.5, at least 0.8, at least 1, at least 1.4, at least 2, at least 3, or at least 4. A person skilled in the art will understand that achieving the desired temperatures is a combination of temperature, insulation, time and energy variables. Increasing the insulation may mean that the energy going into the system can be reduced. Likewise, decreasing the insulation may mean that the energy going into the system needs to be increased. The insulation material can be modified depending on whether the enclosure is designed to be reused or a one-time use enclosure. In some embodiments, the enclosure is made from flame retardant material. In some embodiments, the enclosure is made from a material that does not absorb pesticides and can be cleaned easily. In some embodiments, the enclosure includes a layer of canvas, vinyl, or other thick, durable material on the floor that is designed to protect the floor from the articles that are moved in and out of the enclosure. In some embodiments, the interior of the enclosure is made of a light colored material. Using a light colored material allows users or operators to visually inspect the inside for pests. In some embodiments, the enclosure is made from material that is configured for a one-time use that is disposed of after that use. In other embodiments, the enclosure is made from material that is configured to be reused.

In some embodiments, the enclosure has one or more windows 28 located in at least one wall. In some embodiments, the enclosure includes a window on each wall. In some embodiments, the enclosure includes an inlet hole 30 and an outlet hole 32. When the enclosure is connected to a heating system, the duct 34 bringing air from the heater is placed in the inlet hole 30 and the duct 36 removing air from the enclosure is placed in the outlet hole 32. The enclosure can also include an optional thermocouple 52 and thermocouple securing device 54 located in the cold spot of the enclosure. The location of the cold spot varies depending on the heater location and article setup. For example, when the heater is in a corner of a cube, then the cold spot is usually in the corner that is diagonally opposite the heater. When the heater is placed in the middle of a wall of a cube or rectangle, then the cold spot may be in both corners of the opposite wall. Further, the articles that are located in the enclosure can create cold spots. For example, if bed linens are piled in a corner without airflow under or around it, a cold spot can form underneath the linens. By placing a thermocouple 52 in the cold spot, the operator can ensure that the temperature of the cold spot reaches 115° F. and maintains that temperature over time. Exemplary thermocouple securing devices 54 include a strap secured by snaps or hook and loop, a buckle, or a permanent sleeve or loop that the thermocouple is threaded through.

In some embodiments, the floor is connected to the walls with a seam where the seam is at least one inch off of the ground. The advantage of having the seam slightly off of the ground is that it makes it less likely that pests will find the seam and nest in it.

When the enclosure is inflated, it preferably has an internal volume of at least about 6, about 50, about 368, or about 800 cubic feet.

Figure 5:
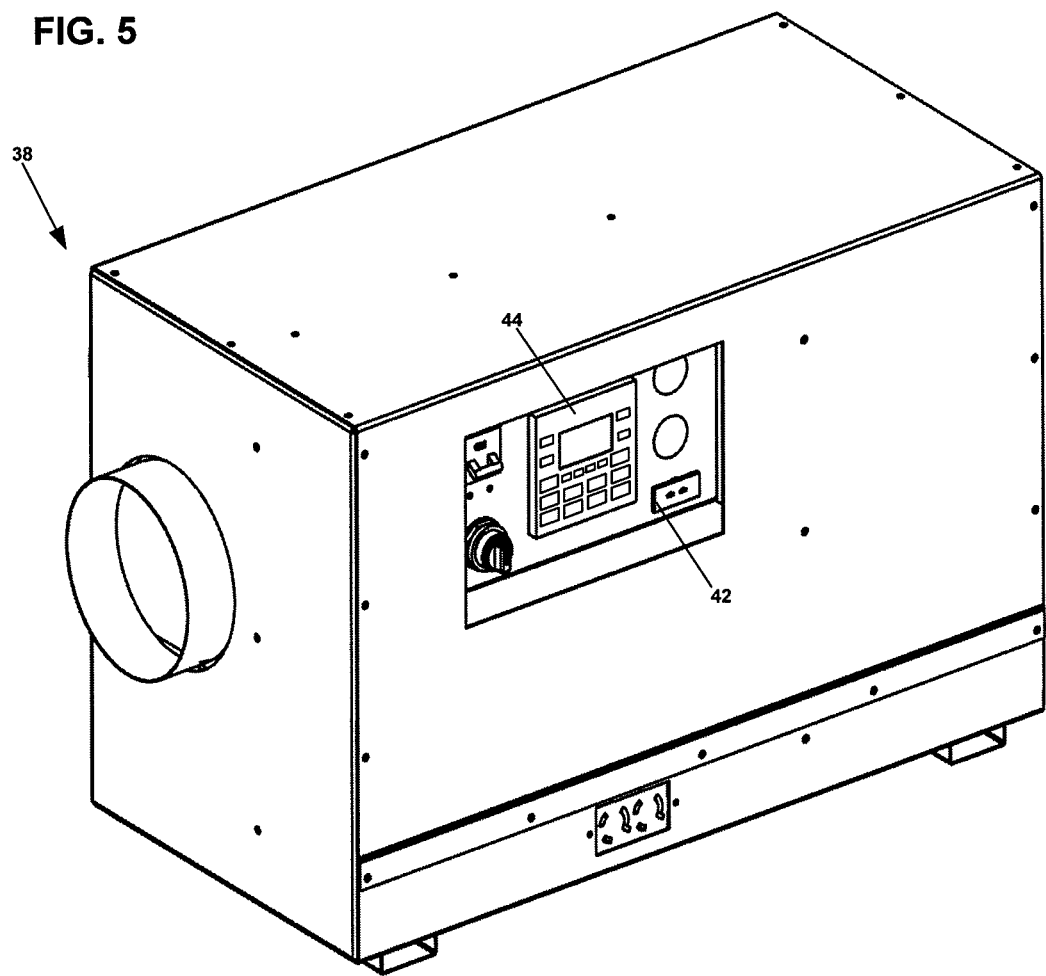
FIG. 5 shows the exterior of a heater.
Figure 6:
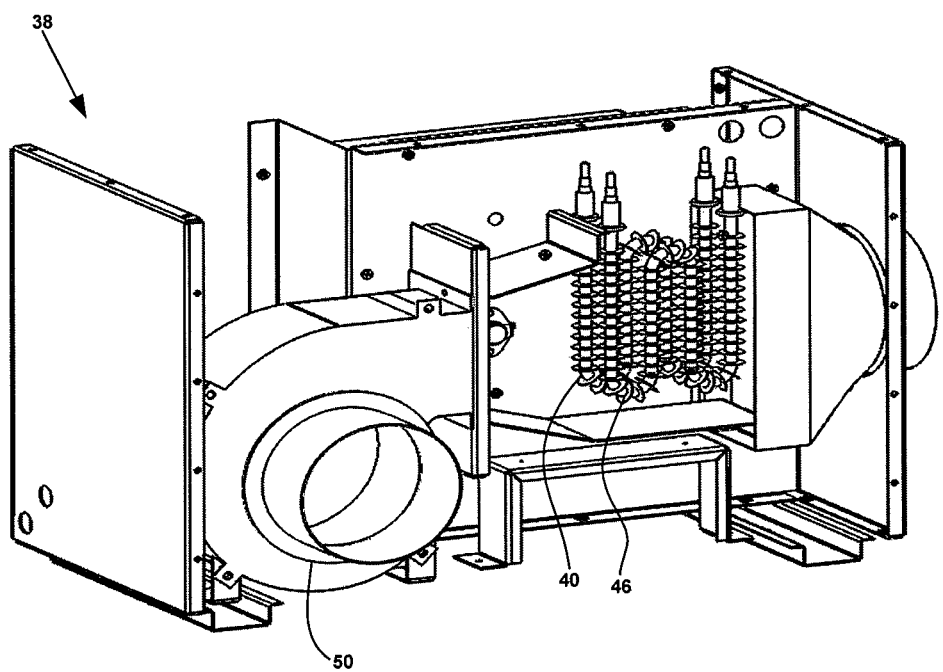
FIG. 6 shows the interior of a heater.

Referring now to FIGS. 5 and 6, the enclosure is used in conjunction with a heating system 38. The heating system includes a first heating element 40, at least one thermocouple 52 attached to the thermocouple plug 42 and electrically connected to the heater and configured to be located inside of the inflated enclosure, and a programmable logic controller 44 electrically connected to the first heater and the thermocouple. It is understood that a PC board or other controller could be used instead of a programmable logic controller. The heating system can also include an internal fan 50. The heater may include a split inlet duct that allows either fresh air or return air to be run through the heater. Alternatively, the duct may not be split, but may include a manifold that allows for either fresh or recirculated air to flow into the enclosure. Using return air may be more energy efficient because the air is already hotter than ambient air. The heating system is connected to the enclosure through the ducts 34 and 36, shown in FIG. 1. In some embodiments, duct 34 may include a manifold that opens and closes to the outside. This manifold would allow fresh air to circulate into the enclosure. This is useful and can be open when inflating the enclosure. Once the enclosure is inflated, it may be beneficial to close the fresh air manifold and allow only recirculated hot air to circulate. This would avoid having to heat fresh air. Duct 36 may also include a manifold that opens and closes to the inside of the enclosure. This manifold may be closed while the enclosure is inflating. Once the enclosure is inflated, the manifold can be opened to allow hot air to recirculate from the enclosure to the heater and then back to the enclosure. In some embodiments, the heating system 38, instead of duct 34, may include the manifold that opens to the outside. The heating system also includes a fan 50 for blowing the hot air into the enclosure and for facilitating the return of air from inside of the enclosure. The fan 50 is also responsible for inflating the enclosure. In some embodiments, the heater includes a second heating element 46 to maximize heat output. If two heating elements are used, then the system preferably works off of two different 15 amp circuits. In one exemplary embodiment, the first heating element can be sized to accommodate a maximum 12 amp current draw on the circuit while powering the heating element and the fan internal to heater and the second heating element is slightly larger and accommodates the PLC while staying under the maximum 12 amp current draw.

The heater can be equipped with various safety features. For example, the controller can be programmed to automatically start the shut down process or shut off completely if the temperature does not reach a desired temperature within a longer period of time, or if it reaches too hot of a temperature within a period of time. For example, if the temperature does not reach a predetermined temperature such as 110° F. or 115° F. within a certain period of time such as 10 hours, 12 hours, or 16 hours, the heater can start decreasing the temperature by 1 degree every 6 minutes or 5 or 10 degrees every hour. In another example, if the temperature reaches a higher temperature such as 120° F., 125° F., or 130° F. within an hour, 2 hours, or 4 hours, the controller can be programmed to start the process of decreasing the temperature by 1 degree every 6 minutes or 5 or 10 degrees every hour. Also, in this example, the controller can be programmed to simply shut down the heater altogether and allow the temperature to cool down on its own. The controller can also be programmed to alert a user or operator that the treatment was not successful. This would allow the user or operator to correct any problems with the system and run the cycle again, or provide an alternative pest treatment. The controller can also be equipped to remotely alert the user or operator that there is a problem on the user or operator's mobile phone, pager, email, or text.

In addition to the enclosure and the heating system, the system can optionally include an internal fan inside of the inflated enclosure. This fan helps circulate the air inside of the enclosure to reduce the likelihood of cold spots inside of the enclosure. Eliminating cold spots inside of the enclosure is important. If the temperature of any spot inside of the enclosure does not reach the minimum temperature needed to kill the pests, then that spot can become a source of contamination. If the system includes an internal fan, the system preferably includes relays and controls that determine if the internal fan inside of the enclosure was powered on and working throughout the heating cycle. The system can also include a stand for supporting the article to be treated. The stand should be designed in a way to maximize the air circulation around the article while minimizing cold spots in and around the article and around the stand. In some embodiments, the stand is L-shaped. In some embodiments, the stand has a minimum of a 1-inch clearance between the floor and the article on the stand to ensure proper circulation. The stand is preferably made of a heat-conducting material such as metal. This also helps eliminate cold spots.

Methods of Use

To set up the enclosure, the deflated enclosure is spread out and hooked up to the heater. The articles are placed inside of the deflated enclosure. In some embodiments, the items are placed in the enclosure in such a way that the item has at least a 1 inch space on all sides between the article and the floor, walls, and other articles in the enclosure once the enclosure is set up or inflated. In some embodiments, the article has at least a 1-2 inch space around the article and the walls, floors, or other articles of the assembled or inflated enclosure. Leaving space around the article is important to assure proper air flow around the article. The heater is turned on and the manifold in the inlet duct 34 is opened to allow air to flow into the deflated enclosure in order to heat and inflate it. While the enclosure is inflating, the manifold in outlet duct 36 is closed. Once the enclosure is inflated, the manifold in the inlet duct 34 is closed, and the manifold in outlet duct 36 is opened. This allows for the warm air inside of the enclosure to be recirculated.

In some embodiments, the present disclosure relates to a method for treating a suspected infested article. The method includes placing an article inside of an enclosure such as the one described above, sealing the enclosure, and then adjusting the temperature inside of the sealed enclosure. In a preferred embodiment, the temperature is gradually increased at a predetermined controlled rate, and then held at a peak temperature for a predetermined period of time, and then gradually decreased at a predetermined controlled rate. In an embodiment, the temperature is increased from room temperature at a rate of from about 10 to about 15 degrees Fahrenheit every hour or one degree every six minutes. The temperature may be increased more slowly over a longer period of time. For example, the temperature can be ramped up at from about 1 to about 10 degrees Fahrenheit every hour. But, the temperature should not be ramped up too quickly for sensitive articles or the article may be damaged. The temperature is increased until the temperature reaches a predetermined peak temperature. The various life stages of bed bugs die at a temperature of about 115 degrees Fahrenheit. But, the articles being treated can include larger objects that have internal spaces that could be infested with pests (i.e., furniture, mattresses, and box springs). Therefore, it may be beneficial to increase the temperature higher than the minimum needed to kill all life stages of pests. Therefore, in some embodiments, the temperature inside of the enclosure is increased to at least about 115° F., at least about 118° F., at least about 120° F., at least about 130° F., or at least about 180° F. and then held at that temperature for a predetermined period of time. The predetermined temperature hold time will vary depending on the temperature, but the temperature can be held from about 1 minute to about 10 hours, about 1 hour to about 5 hours, about 2 hours to about 4 hours, or longer periods of time such as about 2 hours to about 8 hours, or about 8 hours to about 24 hours. After the predetermined period of time has elapsed, the temperature inside of the enclosure is gradually ramped down from the peak temperature to room temperature at a predetermined controlled rate. In an embodiment, the temperature is decreased to room temperature at a rate of from about 10 to about 15 degrees Fahrenheit every hour. As with the ramp up, the temperature can be decreased more slowly or over a longer period of time. Care should be taken not to decrease the temperature too quickly for sensitive articles and risk damaging the articles. Alternatively, the heater can be turned off and the temperature inside of the enclosure can be allowed to return to room temperature on its own. This is most effective when the insulation on the enclosure helps the temperature decrease slowly enough, or where the articles inside of the enclosure are not sensitive to a rapid temperature decrease.

It is especially important to control the temperature increase and decrease when treating articles that are made of multiple materials, such as furniture. Furniture often is made of multiple types of wood, composites, laminates, plastics, and adhesives. If the temperature of the furniture is increased or decreased too quickly, the different materials may change temperature at different rates which could cause the piece of furniture to warp. An alternative embodiment of the present disclosure can be used with articles that are not as temperature sensitive as furniture where the temperature is increased or decreased as quickly as possible. This can be useful when treating non-sensitive items such as soft goods, bedding, curtains, towels, personal items, and clothes. In one preferred embodiment, the disclosed system is designed to have two modes of operation where a user can select a rapid temperature increase and decrease if non-temperature-sensitive articles are being treated or a controlled, slow temperature increase and decrease if temperature sensitive articles are being treated.

Figure 10:
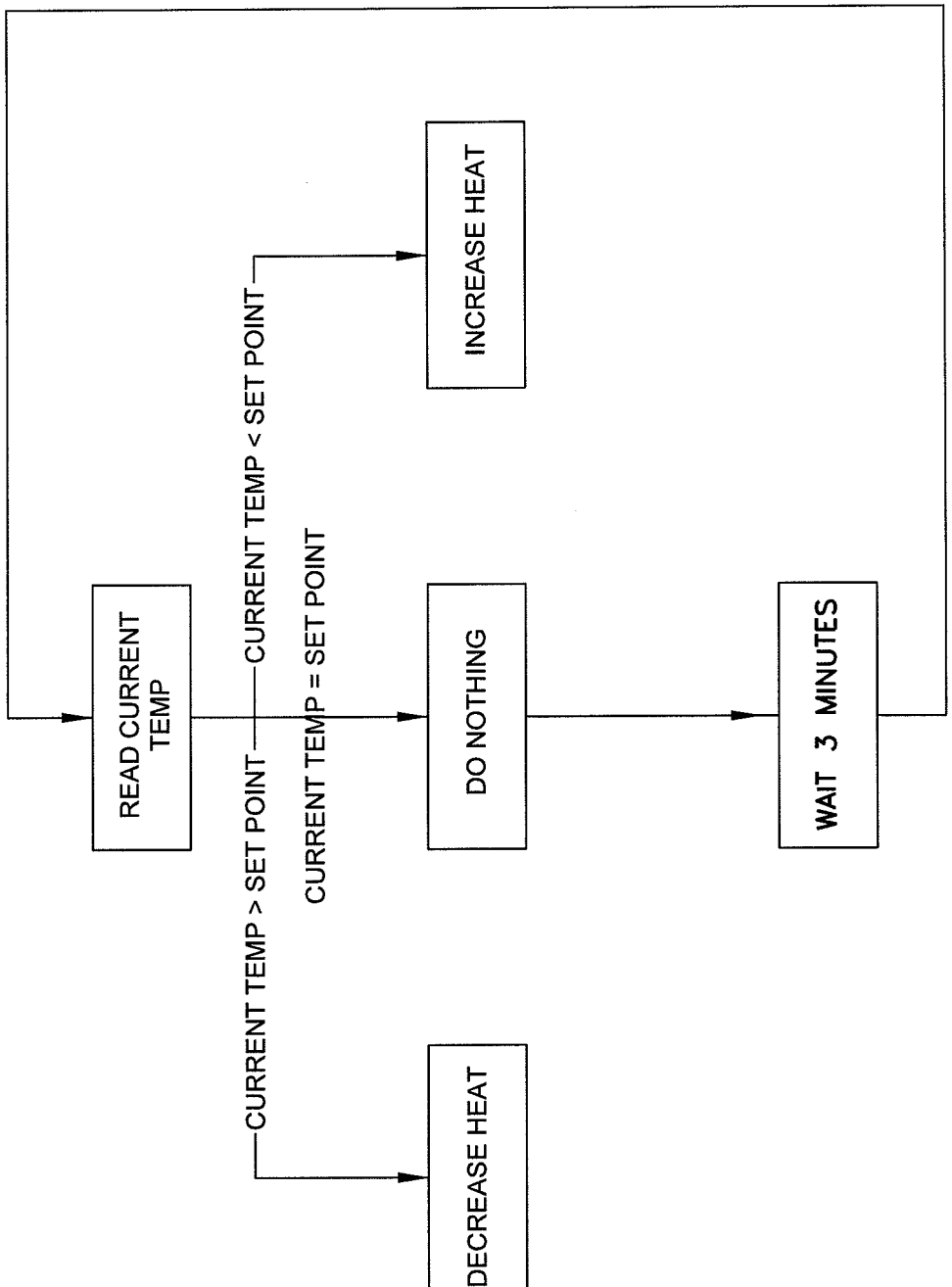
FIG. 10 shows a diagram of an exemplary temperature control program for the programmable logic controller.

In some embodiments, the temperature is automatically adjusted by the programmable logic controller on the heating system. In this method, the heating system has a heater. The heating system also has at least one thermocouple electrically connected to the heater and located inside of the inflated enclosure. The thermocouple measures the actual air temperature inside of the enclosure ($T_{actual}$). The heating system also includes a programmable logic controller electrically connected to the heater and the thermocouple. In some embodiments, the programmable logic controller is programmed with predetermined temperature ramp rate controlled by a set point temperature ($T_{setpoint}$) and a target temperature ($T_{target}$). In some embodiments, the controller can be programmed by a user or operator to vary the temperature ramp rate and hold time. An exemplary predetermined ramp rate may be 1 degree Fahrenheit every six minutes. It is understood that other ramp rates could be used including partial degree increments. It is also understood that step increases could be used where the programmable logic controller increases the temperature by, for example, 5 or 10 degrees and then holds that temperature for a period of time such as 60 minutes. In one exemplary embodiment, the programmable logic controller increases the air temperature inside of the enclosure by increasing the $T_{setpoint}$ one degree every six minutes until $T_{target}$ is reached, comparing the $T_{actual}$ to the $T_{setpoint}$, and adjusting the heater in response to the difference between $T_{actual}$ and $T_{setpoint}$. The heater can be adjusted in several ways. For example, the heater can be adjusted by simply turning the heater on and off. The heater can also be adjusted by increasing or decreasing the power to the heater. And the heater can be adjusted by modifying a ratio of "on time" to "off time". If $T_{actual}<T_{setpoint}$, then the programmable logic controller can turn the heater on, increase the power to the heater, increase the amount of "on time," or decrease the amount of "off time." If $T_{actual}>T_{setpoint}$ then the programmable logic controller can turn the heater off, decrease the power to the heater, decrease the amount of "on time," or increase the amount of "off time." Once $T_{setpoint}=T_{target}$ the programmable logic controller holds the $T_{target}$ for a predetermined period of time (for example, for four hours) and continues to compare the $T_{actual}$ to the $T_{setpoint}$ (which is now also $T_{target}$) and adjust the heat up or down to maintain $T_{target}$. After the temperature has been held for the predetermined period of time, in some embodiments, the programmable logic controller also controls the decrease in air temperature inside of the enclosure by decreasing the $T_{setpoint}$ one degree every six minutes until $T_{actual}$=the original $T_{actual}$, which could be room temperature, comparing the $T_{actual}$ to the $T_{setpoint}$, and turning the heater on or off in response to the difference between $T_{actual}$ and $T_{setpoint}$. If $T_{actual}<T_{setpoint}$, then the programmable logic controller can turn the heater on, increase the power to the heater, increase the amount of "on time," or decrease the amount of "off time." If $T_{actual}>T_{setpoint}$, then the programmable logic controller can turn the heater off, decrease the power to the heater, decrease the amount of "on time," or increase the amount of "off time." This is generally shown in FIG. 10.

In an embodiment, the heating system can include a second thermocouple where a first thermocouple measures the air temperature inside of the enclosure and a second thermocouple measures the air temperature inside of an article, such as a piece of furniture or a mattress. In this embodiment, the first thermocouple controls the temperature ramp rate controlled by a set point temperature, $T_{setpoint}$, (both increase and decrease) but the second thermocouple controls whether the temperature inside of the enclosure has reached $T_{target}$. Using two thermocouples is a more sophisticated way to control the temperature increase and decrease while ensuring that the air temperature inside of an article maintains a high enough temperature.

Exemplary articles to be treated include a mattress, a boxspring, bedding, nightstands, furniture, mirrors, pictures, light fixtures, window treatments, clothing, appliances, commercial fixtures, telephones, remote controls, alarm clocks and small electrical items, luggage, personal items, and pet bedding. The article can be located in a variety of places including a hotel, a house, an apartment or multi-family complex, restaurants, an office building, a movie theater, a train, a bus, an airplane, a car, a truck, a retail store, a college dormitory, a doctor's office, a veterinary clinic, a hospital, and a nursing home. The article can also be a large article such as manufacturing equipment, a bus, a car, a truck, an airplane, or a train.

In addition to using heat to kill pests, the methods disclosed herein can be used in conjunction with pesticides and/or as part of a pest treatment program.

The present disclosure may be better understood with reference to the following examples. These examples are intended to be representative of specific embodiments of the disclosure, and are not intended as limiting the scope of the disclosure.

EXAMPLES

Example 1—Hotel Room Heat Test

Figure 7:
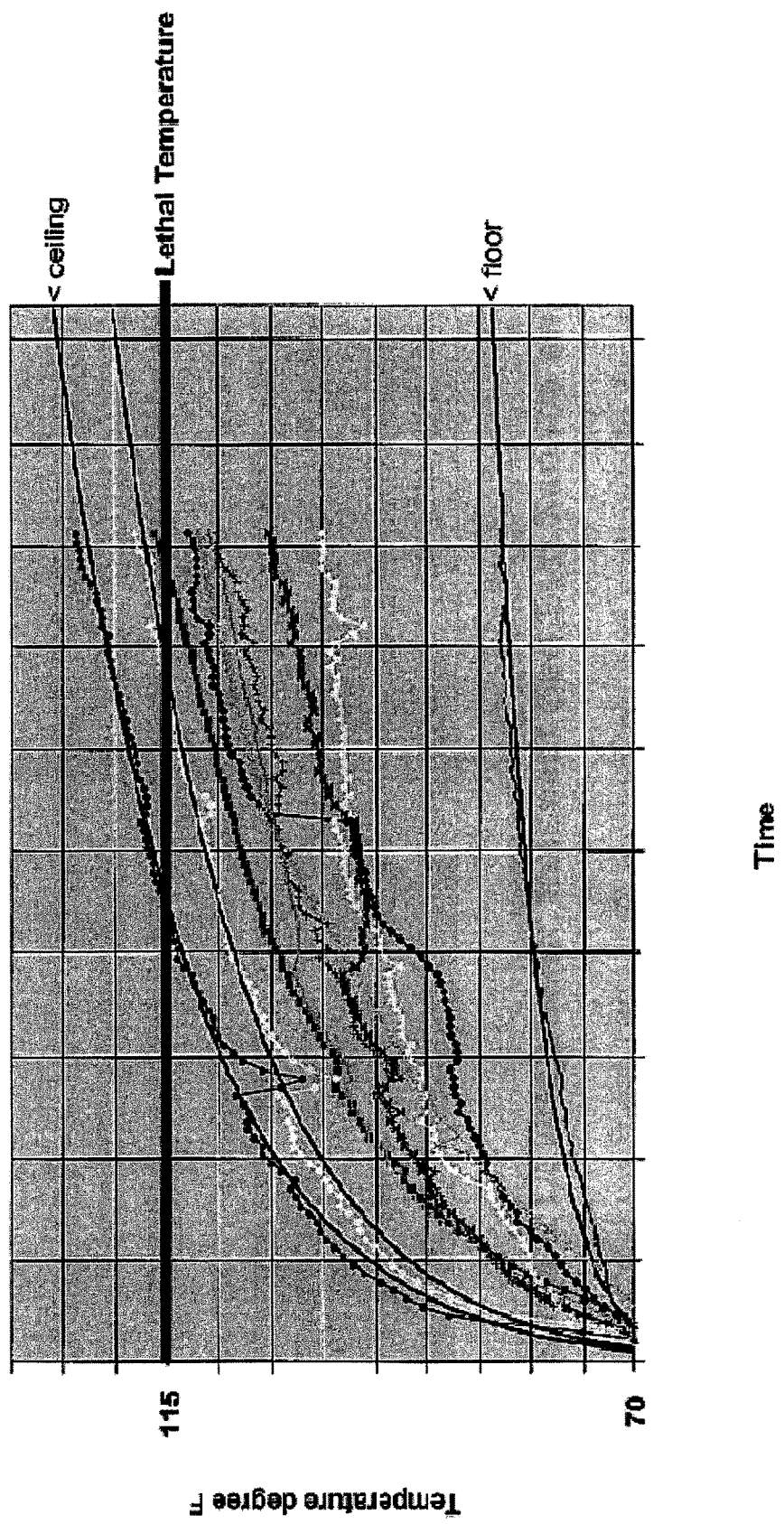
FIG. 7 shows temperature data from a hotel room heat test.

FIG. 7 shows temperature data collected during a treatment of an entire hotel room. The entire room was heated up and the temperature was taken at different locations within the room. The lethal temperature needed to kill bed bugs is 115° F. FIG. 7 shows that the ceiling of the room gets very warm, but the floor is still below the lethal temperature, making it a place for bed bugs to hide and survive the treatment. Lethal temperatures may be achieved at the floor but large fans and substantially more electric power would be required which could be costly and not practical.

Example 2—Efficacy of High Temperatures on Bed Bug Adults and Eggs Over Time

Figure 8A:
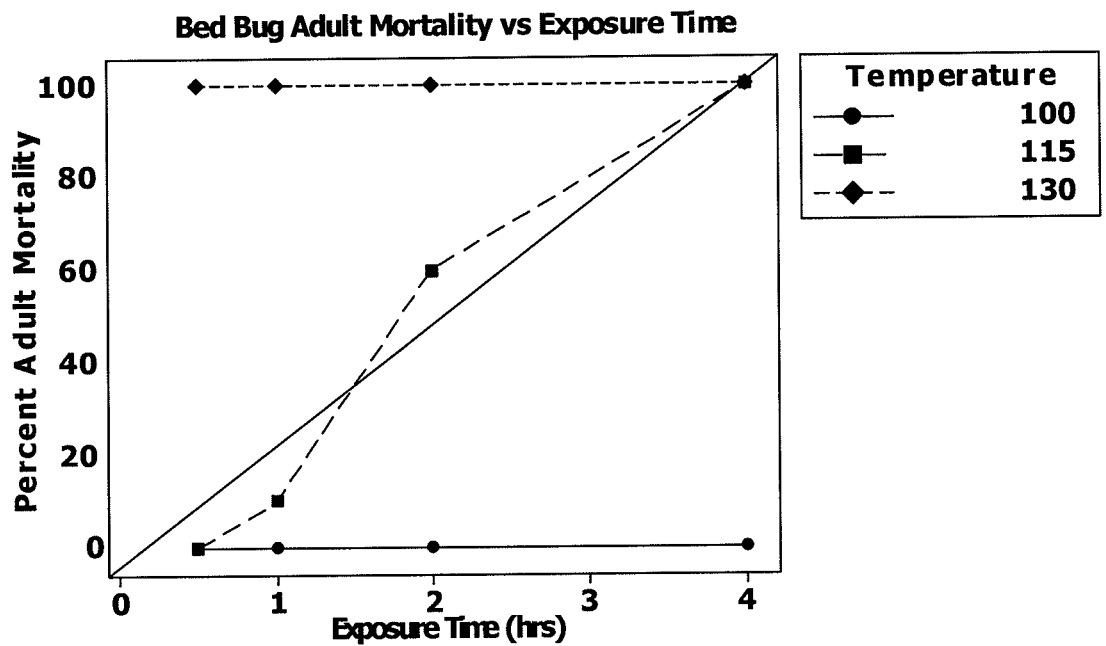
FIGS. 8A and 8B show bed bug adult and egg mortality at various temperatures.
Figure 8B:
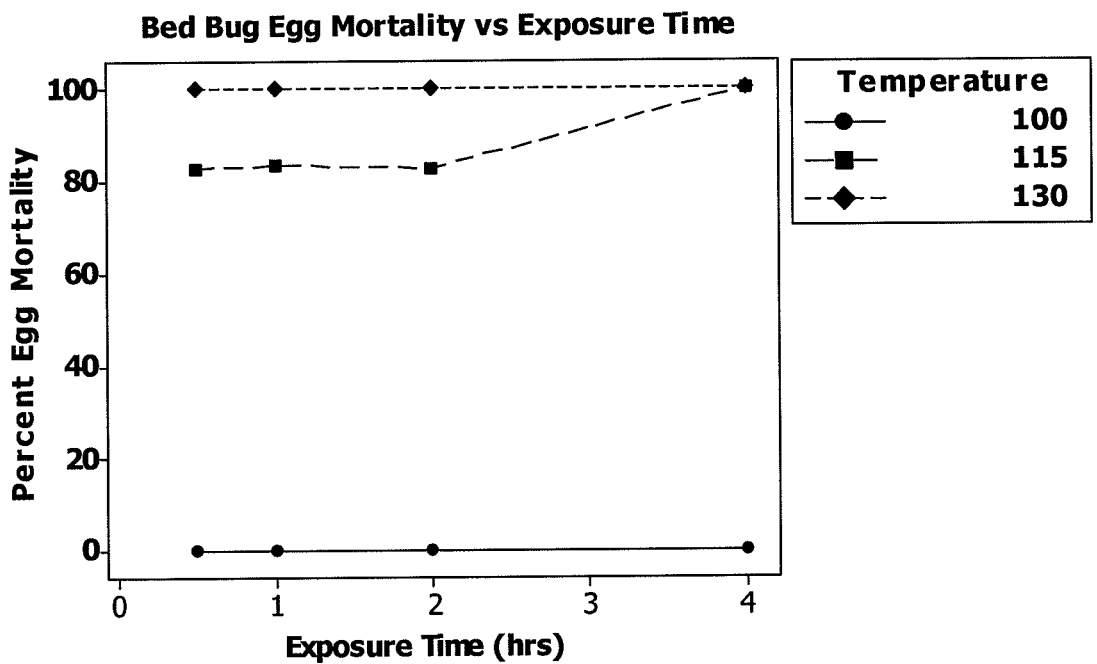

Example 2 evaluated the temperature required to kill bed bug adults and eggs. The example evaluated three elevated temperatures (100° F., 115° F., and 130° F.) for mortality among bed bug adults and eggs when exposed to heat for 30 minutes, 1 hour, 2 hours and 4 hours. Ten adult bed bugs and ten eggs were evaluated for each time and temperature period. The eggs were observed at two weeks for hatch. The beg bug adults were evaluated immediately upon removal from the heated container. FIGS. 8A and 8B show the efficacy of high temperatures on bed bug adults and eggs over time. The figures show that that temperature alone is not enough to be effective, but that a combination of high temperatures and time is needed. FIGS. 8A and 8B show that maintaining 115° F. for four hours is effective against eggs and adults. FIGS. 8A and 8B also show that if the temperature is increased, the amount of time can be decreased as 130° F. was effective against eggs and adults in 30 minutes.

Example 3—Heat Trial Run on a Mattress

Example 3 determined the heat penetration into the interior of a mattress. For this example, thermocouples were placed at various locations inside of an enclosure and inside of a mattress. FIG. 9 shows that an internal air temperature inside of the enclosure of 123° F. is high enough to raise the temperature of the interior of the mattress to the required 115° F. The air around the exterior and the air in the interior of the article being treated must reach 115° F., otherwise, the interior spaces of the article, particularly with large articles like furniture and mattresses, can become a harborage for bed bugs.

The above specification, examples and data provide a complete description of the disclosed compositions and methods of use. Since many embodiments of the disclosure can be made without departing from the spirit and scope of the invention, the invention resides in the claims.

We claim:

1. A pest treatment system comprising:
 a flexible and inflatable enclosure made of insulated material, the enclosure comprising:
  a floor;
  at least one side connected to the floor, wherein when the enclosure is inflated the side and floor form at least part of an interior space where articles can be placed;
  a zipper on at least part of the side that allows for articles to be placed inside of the enclosure;
  an inlet hole; and
  an outlet hole; and
 a heating system comprising:
  a heater connected to the inlet hole and the outlet hole, the heater including a fan;
  at least two thermocouples electrically connected to the heater and configured to be located inside of the inflated enclosure; and
  a controller electrically connected to the heater.

2. The system of claim 1, wherein the heating system comprises at least four thermocouples.

3. The system of claim 1, wherein the floor is made of vinyl.

4. The system of claim 1, wherein the enclosure further comprises a flap sealing system on top of the zipper.

5. The system of claim 1, wherein the heater is connected to the inlet hole with a first duct and to the outlet hole with a second duct.

6. The system of claim 1, wherein the heater comprises two heating elements.

7. The system of claim 1, wherein the heater comprises at least two power cords.

8. The system of claim 1, wherein the enclosure is made of flame-retardant material.

9. The system of claim 1, wherein the insulated material has an R-value of at least 0.5.

10. The system of claim 1, wherein the insulated material has an R-value of at least 1.

11. The system of claim 1, wherein the enclosure has an internal volume of at least about 50 cubic feet when inflated.

12. The system of claim 1, wherein the enclosure is configured to be reused.

13. A method of treating one or more articles comprising:
 opening a zipper on a flexible and inflatable enclosure made of insulated material to open a side, the enclosure comprising:
  a floor; and
  at least one side connected to the floor;
 placing the one or more articles inside of the enclosure;
 sealing the enclosure by closing the zipper;
 connecting a heater to the enclosure through at least one port;
 placing at least one thermocouple within the enclosure, the thermocouple connected to the heater;
 powering on the heater to blow hot air into the enclosure;
 monitoring the temperature with the thermocouple; and
 maintaining a temperature of a least 115° F. inside the enclosure for about 1 minute to about 10 hours.

14. The method of claim 13, wherein the temperature maintained within the enclosure is at least 120° F.

15. The method of claim 13, wherein the temperature is maintained for about 1 hour to about 5 hours.

16. The method of claim 13, wherein the heater is configured to not exceed a maximum temperature.

17. The method of claim 13, further comprising shutting down the heater after the temperature has been maintained.

18. The method of claim 17, wherein the heater shuts down automatically.

19. The method of claim 17, wherein the articles are selected from the group consisting of furniture, mattresses, and box springs.

* * * * *